US012811457B2

(12) United States Patent
García Urbieta et al.

(10) Patent No.: US 12,811,457 B2
(45) Date of Patent: Nov. 24, 2026

(54) STATOR FOR AN ELECTRIC MACHINE

(71) Applicant: GKN Automotive Limited, Birmingham (GB)

(72) Inventors: Jon García Urbieta, Zumaia (ES); Alberto Peña Rodriguez, Zumaia (ES); Pablo Granados, Zumaia (ES); Damián Caballero, Zumaia (ES)

(73) Assignee: GKN Automotive Limited, Birmingham (GB)

( * ) Notice: Subject to any disclaimer, the term of this patent is extended or adjusted under 35 U.S.C. 154(b) by 233 days.

(21) Appl. No.: 18/616,236

(22) Filed: Mar. 26, 2024

(65) Prior Publication Data

US 2024/0429766 A1 Dec. 26, 2024

(30) Foreign Application Priority Data

Jun. 22, 2023 (DE) ..................... 10 2023 116 490.2

(51) Int. Cl.
*H02K 3/28* (2006.01)
*H02K 1/16* (2006.01)
*H02K 3/12* (2006.01)

(52) U.S. Cl.
CPC ................. *H02K 3/28* (2013.01); *H02K 1/16* (2013.01); *H02K 3/12* (2013.01); *H02K 2203/09* (2013.01)

(58) Field of Classification Search
CPC .. H02K 3/28; H02K 1/16; H02K 3/12; H02K 2203/09; H02K 3/50; H02K 1/165; H02K 3/04; H02K 2213/03
USPC .......................................................... 310/180
See application file for complete search history.

(56) References Cited

U.S. PATENT DOCUMENTS

| | | | | |
|---|---|---|---|---|
| 2017/0033630 | A1* | 2/2017 | Tamura | H02K 3/18 |
| 2019/0288574 | A1* | 9/2019 | Leonardi | H02K 3/12 |
| 2020/0067362 | A1* | 2/2020 | Shiah | H02K 3/28 |
| 2020/0169137 | A1* | 5/2020 | Tang | H02K 7/006 |
| 2020/0169149 | A1* | 5/2020 | Liang | H02K 15/36 |
| 2020/0266689 | A1* | 8/2020 | Dunn | H02K 1/16 |
| 2020/0287434 | A1* | 9/2020 | Dunn | H02K 3/28 |
| 2021/0175763 | A1* | 6/2021 | Kim | H02K 1/16 |

FOREIGN PATENT DOCUMENTS

| | | | |
|---|---|---|---|
| CN | 213782983 | U | 7/2021 |
| CN | 113675965 | A | 11/2021 |
| CN | 113809857 | A | 12/2021 |

(Continued)

*Primary Examiner* — Charles Reid, Jr.
(74) *Attorney, Agent, or Firm* — Reising Ethington P.C.

(57) ABSTRACT

A stator including a core having slots and a hairpin winding. The winding includes hairpin conductors with two legs connected at a head portion. A slot pitch between the two legs is defined by the head portion. The legs are received in the slots in two radially adjacent layers. The head portions extend from the core at an insertion end and end sections of the legs opposite the head portions extend from the core at a welding end. The winding defines three phase windings, each having at least one branch. Each branch has a phase terminal formed at one of the end sections for connecting to a phase busbar, and a neutral terminal formed at one of the end sections for connecting to a neutral busbar. The terminals are arranged at the welding end, in one of an outermost layer and an innermost layer of the radially adjacent layers.

8 Claims, 14 Drawing Sheets

(56) References Cited

FOREIGN PATENT DOCUMENTS

| | | | |
|---|---|---|---|
| CN | 215300307 | U | 12/2021 |
| CN | 114172294 | A | 3/2022 |
| DE | 102018207224 | A1 | 5/2018 |
| DE | 102017201533 | A1 | 8/2018 |
| DE | 102019105563 | A1 | 9/2020 |
| DE | 102021100731 | A1 | 7/2022 |

* cited by examiner

| 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|
| V1_3 | V2_3 | U3_30 | U4_30 | W1_3 | W2_3 | V3_30 | V4_30 | U1_5 | U2_5 | W3_28 | W4_28 | V1_5 | V2_5 | U3_28 | U4_28 |
| V3_31 | V4_31 | U1_4 | U2_4 | W3_29 | W4_29 | V1_4 | V2_4 | U3_29 | U4_29 | W1_4 | W1_4 | V3_29 | V4_29 | U1_6 | U2_6 |
| V1_11 | V2_11 | U3_22 | U4_22 | W1_11 | W2_11 | V3_22 | V4_22 | U1_13 | U2_13 | W3_20 | W4_20 | V1_13 | V2_13 | U3_20 | U4_20 |
| V3_23 | V4_23 | U1_12 | U2_12 | W3_21 | W4_21 | V1_12 | V2_12 | U3_21 | U4_21 | W1_12 | W1_12 | V3_21 | V3_21 | U1_14 | U2_14 |
| V1_19 | V2_19 | U3_14 | U4_14 | W1_19 | W2_19 | V3_14 | V4_14 | U1_21 | U2_21 | W3_12 | W4_12 | V1_21 | V2_21 | U3_12 | U4_12 |
| V3_15 | V4_15 | U1_20 | U2_20 | W3_13 | W4_13 | V1_20 | V2_20 | U3_13 | U4_13 | W1_20 | W1_20 | V3_13 | V4_13 | U1_22 | U2_22 |
| V1_27 | V2_27 | U3_6 | U4_6 | W1_27 | W2_27 | V3_6 | V4_6 | U1_29 | U2_29 | W3_4 | W4_4 | V1_29 | V2_29 | U3_4 | U4_4 |
| V3_7 | V4_7 | U1_28 | U2_28 | W3_5 | W4_5 | V1_28 | V2_28 | U3_5 | U4_5 | W1_28 | W1_28 | V3_5 | V4_5 | U1_30 | U2_30 |

Fig. 13B

| 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|
| W1_5 | W2_5 | V3_28 | V4_28 | U1_7 | U2_7 | W3_26 | W4_26 | V1_7 | V2_7 | U3_26 | U4_26 | W1_7 | W2_7 | V3_26 | V4_26 |
| W3_27 | W4_27 | V1_6 | V2_6 | U3_27 | U4_27 | W1_6 | W2_6 | V3_27 | V4_27 | U1_8 | U2_8 | W3_25 | W4_25 | V1_8 | V2_8 |
| W1_13 | W2_13 | V3_20 | V4_20 | U1_15 | U2_15 | W3_18 | W4_18 | V1_15 | V2_15 | U3_18 | U4_18 | W1_15 | W2_15 | V3_18 | V4_18 |
| W3_19 | W4_19 | V1_14 | V2_14 | U3_19 | U4_19 | W1_14 | W2_14 | V3_19 | V4_19 | U1_16 | U2_16 | W3_17 | W4_17 | V1_16 | V2_16 |
| W1_21 | W2_21 | V3_12 | V4_12 | U1_23 | U2_23 | W3_10 | W4_10 | V1_23 | V2_23 | U3_10 | U4_10 | W1_23 | W2_23 | V3_10 | V4_10 |
| W3_11 | W4_11 | V1_22 | V2_22 | U3_11 | U4_11 | W1_22 | W2_22 | V3_11 | V4_11 | U1_24 | U2_24 | W3_9 | W4_9 | V1_24 | V2_24 |
| W1_29 | W2_29 | V3_4 | V4_4 | U1_31 | U2_31 | W3_2 | W4_2 | V1_31 | V2_31 | U3_2 | U4_2 | W1_31 | W2_31 | V3_2 | V4_2 |
| W3_3 | W4_3 | V1_30 | V2_30 | U3_3 | U4_3 | W1_30 | W2_30 | V3_3 | V4_3 | **U1_32** | **U2_32** | **W3_1** | **W4_1** | **V1_32** | **V2_32** |

STATOR FOR AN ELECTRIC MACHINE

CROSS-REFERENCE TO RELATED APPLICATIONS

This application claims priority to German Application No. 10 2023 116 490.2, filed on Jun. 22, 2023, which application is hereby incorporated herein by reference in its entirety.

BACKGROUND

With the rising performance requirements of electric machines, windings composed of hairpin conductors with rectangular wire cross sections have been realised, which provide higher slot filling rates and power density. The stator winding structure and the winding connections of the phases lead wires and the neutral wires are distributed to minimise the number of special-shaped hairpin conductors in order to facilitate manufacturing.

CN 213782983 U relates to a flat wire hairpin stator structure and a motor. The flat wire hairpin stator structure comprises a stator core, a stator winding and a busbar. The stator iron core comprises an iron core body and a plurality of stator grooves which are uniformly formed in the circumferential wall surface of the inner side of the iron core body at intervals and extend in the axial direction of the iron core body. The stator winding comprises a plurality of layers of flat wire conductors inserted in each stator slot, one end of each layer of flat wire conductor is an insertion end, and the other end of each layer of flat wire conductor is a welding end. The multiple layers of flat wire conductors are bent in the circumferential direction of the iron core body to form a U-phase winding, a V-phase winding and a W-phase winding in a surrounding mode. A conductor outgoing line and a conductor neutral line of each parallel branch of each phase winding are arranged at the welding ends of the flat wire conductors. The busbar comprises a U-phase outgoing line busbar, a V-phase outgoing line busbar, a W-phase outgoing line busbar and a neutral line busbar which are arranged at the welding end of the flat wire conductor. The multilayer flat wire conductor layout of the stator winding is simplified, and the overall size of the flat wire hairpin motor is reduced.

CN 113809857 A discloses a multi-layer hairpin type flat wire winding stator including a stator core and a hairpin flat wire wave winding. Stator slots are arranged in the stator core, and the hairpin flat wire wave winding is embedded in the stator slots. The hairpin flat wire wave winding comprises more than two branches. The stator slots where three-phase windings of the hairpin flat wire wave winding are located are arranged in a pairwise spaced mode and sequentially arranged. Any branch is changed to an equivalent slot of the adjacent stator slot after circling by half of layers on the circumference, and long-distance or short-distance connection is adopted when the branch is changed to the equivalent slot of the adjacent stator slot in a cross-layer mode, so that the head end and the tail end of any branch are located on the innermost layer and the outermost layer in the radial direction of the stator. Long-distance or short-distance connection occurs only when cross-layer transposition is performed to equivalent slots of adjacent stator slots, so that the head ends and the tail ends of the branches are located on the innermost layer and the outermost layer in the radial direction of an armature, and a single branch of each phase can pass through equivalent positions of all layers of all the stator slots of the phase where the single branch is located.

CN 114172294 A discloses a flat wire motor and a wire outlet mechanism and a winding mechanism thereof, and the wire outlet mechanism comprises a neutral bar which comprises an arc-shaped plate which is arranged perpendicular to the axis of the winding of the flat wire motor and is embedded in the end face of the winding. The binding posts are arranged on the inner cambered surface and the outer cambered surface of the arc-shaped plate and used for being connected with the winding, and the binding posts arranged on the inner cambered surface and the outer cambered surface are arranged in a staggered mode. The wiring terminal comprises a wiring main board which is arranged perpendicular to the plane where the arc-shaped plate is located. The access line is arranged in the middle of the wiring mainboard, is far away from one side of the arc-shaped plate and is used for accessing external wiring voltage and the outgoing lines are arranged at the two ends of the wiring mainboard and are used for being connected with the winding. According to the flat wire motor and the wire outlet mechanism and the winding mechanism thereof, the design cost of the flat wire motor can be reduced.

CN 215300307 U discloses a flat wire winding structure and a stator and a motor comprising the same, the flat wire winding structure is arranged in a stator core, and a tooth portion of the stator core is provided with a plurality of wire slots. Each wire slot is provided with an even number of mounting positions which are arranged in the radial direction and are used for accommodating pins of a plurality of flat wire coil conductors, the flat wire winding structure comprises a first phase winding, a second phase winding and a third phase winding, and each phase winding comprises four parallel branches. Each of the first phase winding, the second phase winding and the third phase winding is of a double-layer winding structure; and in a circle of winding around the stator core, each parallel branch is led in from the upper layer of one wire slot and led out from the lower layer of the other wire slot, and the two different parallel branches of the same-phase winding are overlapped in the wire slots to form the double-layer winding structure. The motor provided by the utility model has better torque output performance and higher power factor.

SUMMARY

The stator for an electric machine comprises a stator core having a plurality of slots and a hairpin winding. The hairpin winding comprises hairpin conductors with two leg portions connected at a head portion, wherein a slot pitch between the two leg portions is defined by the head portion, the slot pitch of each of the hairpin conductors being identical. The leg portions of the hairpin conductors are received in the slots in at least two radially adjacent layers, the head portions extending out of the stator core at an insertion end and end sections of the leg portions opposite of the head portions extending out of the stator core at a welding end. The hairpin winding defines at least three phase windings, each phase winding having at least one branch, and each branch of each phase winding having a phase terminal formed at one of the end sections for connecting to a phase busbar, and a neutral terminal formed at one of the end sections for connecting to a neutral busbar. The phase terminals and the neutral terminals are all arranged at the welding end of the hairpin winding, in at least one of an outermost layer of the radially adjacent layers and an innermost layer of the radially adjacent layers.

It is an advantage of the stator that the structure of the hairpin winding is scalable to electric machines with different parameters regarding the number of layers per slot, the number of slots, the number of phase winding turns, the number of slots per pole and per phase, the number of parallel branches per phase, the number of poles, and the number of phases. The slot pitch of each of the hairpin conductors being identical means that the hairpin conductors all span the same number of slots in circumferential direction of the slots and the same number of layers in the radial direction. The actual distance measure between the two leg portions depends on the distance of the respective slots and layers, which increases in the radial direction. With the phase terminals and the neutral terminals all being arranged at the welding end of the hairpin winding, the manufacturing process is enhanced as the welding operations to establish the contacts to the respective busbars are performed in a limited area.

The hairpin conductors can be made from wire with rectangular cross section, for example from flat wire. The wire of the hairpin conductors is generally solid but may as well be hollow, for example to provide a cooling duct through the hairpin conductor. The leg portions and the head portions can be formed by bending the wire. The leg portions are received in different slots of the stator core and in different layers, the slot pitch of the head portion spanning the circumferential distance between the two slots and the radial distance between the two layers. The stator core has a generally cylindrical form defining a longitudinal axis, in relation to which any statements regarding circumferential, axial and radial directions are to be understood. The end sections of the branches are electrically interconnected, usually by welding, each branch forming a conductor with one of the phase terminals at one end and one of the neutral terminals at the other end. The connected end sections of two consecutive hairpin conductors of a branch span the same slot pitch as the head portions. The neutral terminals can be connected to a single neutral busbar, forming a star connection, or the neutral terminals of each phase winding pair can be connected to one of a plurality of neutral busbars to form a delta connection. Connecting the phase terminals and the neutral terminals is advantageously facilitated, because the phase terminals and the neutral terminals are all arranged on the welding end of the hairpin winding. Further, the phase and neutral busbars can be arranged radially between the phase terminals and the neutral terminals in the outermost layer and the innermost layer, thus reducing the overall axial length of the stator. A group of the end sections forming the phase terminals and the neutral terminals can extend axially beyond a group of the end sections forming the electrical interconnections, which can be welded together in pairs so as to form the parallel branches of the phase windings. The neutral terminal of each branch is arranged in the layer opposite in radial direction to the respective phase terminal of the branch. Hence, each branch winding extends, starting at the phase terminal, either from the innermost or the outermost layer to the respective radial opposite layer. The branches starting from the innermost layer are wound in opposite rotational sense around the stator as the branches starting from the outermost layer.

According to an embodiment, a terminal connection range is defined by a sector of a circumference of the stator occupied by the phase terminals and the neutral terminals on the welding end. A span of the terminal connection range over a circumference of the stator is minimised. That means the phase terminals and the neutral terminals are packed as closely together as possible to reduce the terminal connection range to the minimum possible span. The resulting minimised span depends upon a number of poles and a number of slots per pole per phase of the stator.

According to a further embodiment, the phase terminals are evenly divided between the outermost layer and the innermost layer. For example, a first half of the phase terminals are arranged in the outermost layer and a second half of the phase terminals are arranged in the innermost layer. The distribution of the phase terminals to the outermost layer and the innermost layer has the advantage that the phase terminals are located over a limited range of the circumference, thus reducing the circumferential extension of welding operations. Generally, the number of branches per phase winding can be any natural number greater than zero. The person skilled in the art is aware that in cases with uneven numbers the phase terminals cannot be divided evenly. Anyway, a distribution of one phase terminal in the outermost layer and two phase terminals in the innermost layer or two phase terminals in the outermost layer against three phase terminals in the innermost layer is still advantageous, as the associated neutral terminals are always arranged in the respective opposite layer of the phase terminal.

According to a further embodiment, each phase winding has a plurality of parallel branches, and at least one pair of the phase terminals of the parallel branches of at least one phase winding extend both from one common phase slot. Thus, if a phase winding has two parallel branches, one phase terminal is arranged in the outermost layer of that common phase slot and the other phase terminal is arranged in the innermost layer of that common phase slot.

According to a further embodiment, a plurality of pairs of the phase terminals of the parallel branches of at least one of the phase windings extend pairwise from the plurality of adjacently arranged common phase slots. If a phase winding has, for example, four or six branches, then two or three phase terminals can be arranged in the outermost layer, and the two or three other phase terminals can be arranged in the innermost layer, which are pairwise arranged in two or three common phase slots, which can be arranged adjacently.

According to a further embodiment, each phase winding has a plurality of parallel branches, wherein a first half of the phase terminals of the parallel branches of at least one of the phase windings extend from the innermost layer of at least one first offset phase slot, wherein a second half of the phase terminals of the at least one phase winding extend from the outermost layer of at least one second offset phase slot, and wherein the at least one first offset phase slot is circumferentially offset relative to the at least one second offset phase slot. This embodiment is particularly beneficial for hairpin windings with an uneven number of phase windings. If the parallel branches of at least one phase winding are pooled pairwise in common phase slots and the parallel branches of at least one other phase winding are distributed circumferentially to offset phase slots, the resulting distribution of the associated neutral terminals overlaps more tightly with the phase terminals over a limited range of the circumference, thus again, reducing the circumferential extension of welding operations.

According to a further embodiment, each phase winding has a plurality of parallel branches, wherein at least one pair of the neutral terminals of the parallel branches of at least one of the phase windings extend both from one common neutral slot. Thus, if a phase winding has two parallel branches, for example, one neutral terminal is arranged in the outermost layer of that common neutral slot and the other neutral terminal is arranged in the innermost layer of that common neutral slot. Further, if a phase winding has more than two parallel branches, a plurality of pairs of the neutral terminals of the parallel branches of the at least one phase winding may extend pairwise from a plurality of adjacently arranged common neutral slots.

According to a further embodiment, each phase winding has a plurality of parallel branches, wherein a first half of the neutral terminals of the parallel branches of at least one phase winding extend from the innermost layer of at least one first offset neutral slot, and wherein a second half of the neutral terminals of the at least one phase winding extend from the outermost layer of at least one second offset neutral slot, and wherein the at least one first offset neutral slot is circumferentially offset relative to the at least one second offset neutral slot. Offsetting the neutral terminals of one phase winding in circumferential direction to the first and second offset neutral slots has the advantage that one of the first and second offset neutral slots can be arranged between two common phase slots, resulting in a tighter overlap of the slots occupied by phase terminals and neutral terminals. The person skilled in the art is aware that either half of the neutral or the phase terminals of one phase winding are offset, both having the same beneficial result.

The slots occupied by phase terminals and neutral terminals are the common phase slots, the first offset phase slots, the second offset phase slots, the common neutral slots, the first offset neutral slots and the second offset neutral slots, which together define a terminal slot range spanning in circumferential over a fraction of the total number of slots. The terminal slot range may span over less than two thirds of the total number of slots, preferably over less than one half of the total number of slots. The terminal slot range may further span over a continuous range of adjacent slots, in which at least one phase terminal or at least on neutral terminal is arranged.

According to a further embodiment, each phase winding has a plurality of parallel branches, at least the phase terminal of a first branch and the neutral terminal of a second branch being arranged in one of the outermost layer and the innermost layer, wherein the first branch and the second branch are connected on the respective opposite one of the outermost layer and the innermost layer. This embodiment reduces the number of phase terminals and neutral terminals by connecting two branches and allows to arrange the neutral terminal of the first branch and the phase terminal of the second branch in the same layer. The connection of the phase terminal of the first branch and the neutral terminal of the second branch can be established by a jumper. The branches of each phase winding can be connected pairwise in this manner.

BRIEF DESCRIPTION OF THE DRAWINGS

FIGS. 13A, 13B and 13C show a schematic of a winding structure for the stator according to a further embodiment.

DESCRIPTION

This application discloses to a stator for an electric machine comprising a stator core having a plurality of slots and a hairpin winding.

Figure 1A:
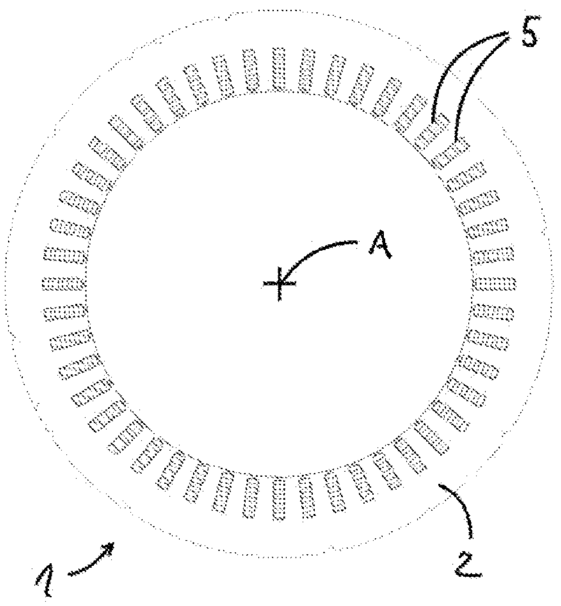
FIGS. 1A and 1B show embodiments of a stator for an electric machine in cross section.

In FIG. 1A, an embodiment of a stator 1 for an electric machine is depicted in a schematic cross-sectional view in direction of a longitudinal axis A. A stator core 2 has a plurality of slots 5, in which a hairpin winding (see FIG. 4) is received. In the depicted embodiment the stator core 2 comprises 48 slots 5 evenly distributed in circumferential direction of the stator core 2. Leg portions of hairpin conductors (see FIG. 3) are received in the slots 5 in at least two radially adjacent layers Li, wherein i is an index representing the number Z of layers Li. The stator 1 of FIG. 1A comprises eight layers.

Figure 1B:
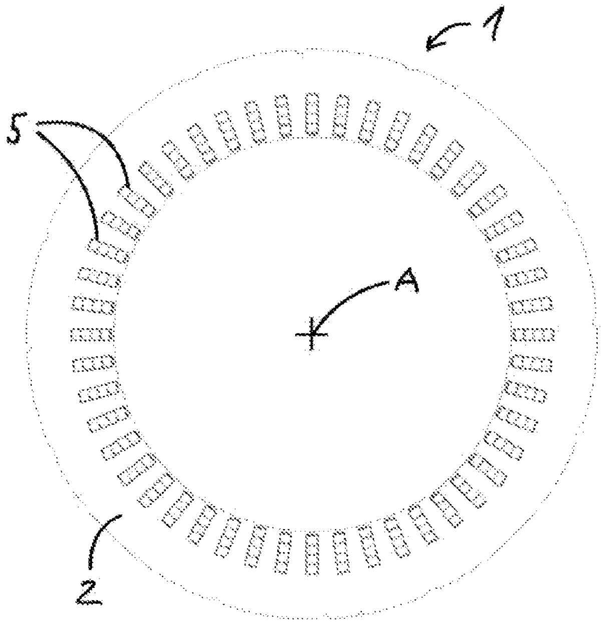

In FIG. 1B, a further embodiment of the stator 1 is depicted in a schematic cross-sectional view in direction of the longitudinal axis A. The stator core 2 also comprises 48 slots 5 evenly distributed in circumferential direction of the stator core 2, each slot 5 having four layers in this embodiment.

Figures 2A, 2B:
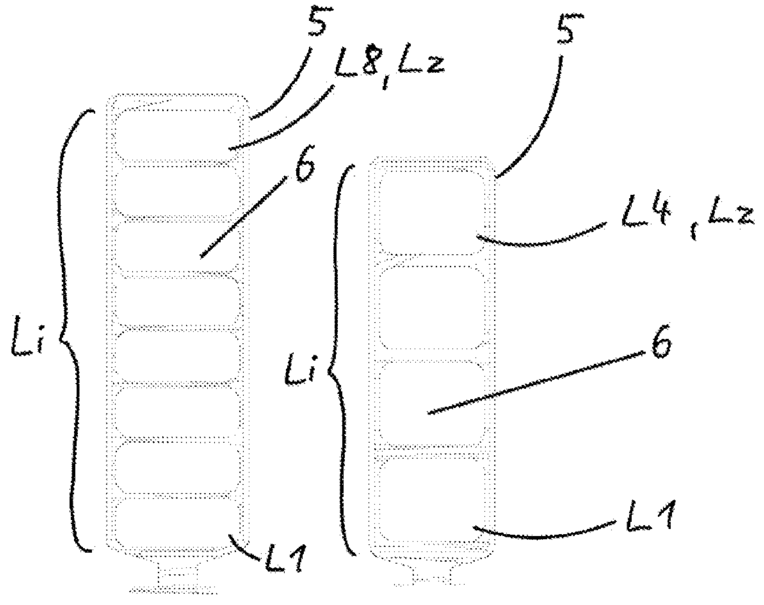
FIGS. 2A and 2B show enlarged details of the stators of FIGS. 1A and 1B.

In FIG. 2A, an enlarged detail showing one of the slots 5 of FIG. 1A is illustrated. In the depicted embodiment, the leg portions 6 are received in the slot 5 in each of the eight radially adjacent layers Li, L1 being the innermost layer and L8 being the outermost layer. More generally, the outermost layer is designated as Lz for an arbitrary number of z layers Li.

In FIG. 2B, an enlarged detail showing one of the slots 5 of FIG. 1B is illustrated. This embodiment has four radially adjacent layers Li occupied by the leg portions 6, L1 being the innermost layer and L4 being the outermost layer Lz.

Figure 3:
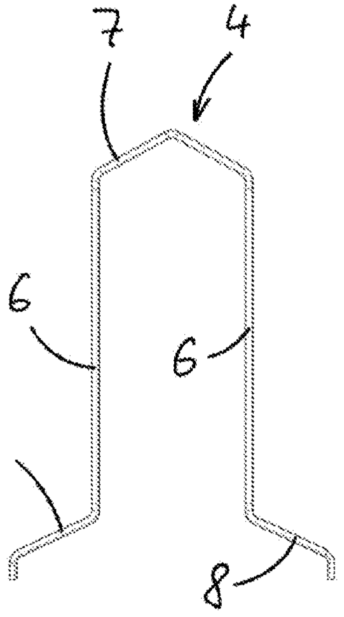
FIG. 3 shows a hairpin conductor.

In FIG. 3, a hairpin conductor 4 is illustrated as a detail. The hairpin winding (see FIG. 4) is composed of multiple hairpin conductors 4 with two leg portions 6 connected at a head portion 7, wherein a slot pitch is defined by the number of slots 5 spanned by the head portion 7. The slot pitch of each of the hairpin conductors 4 of the hairpin winding is identical. The two leg portions 6 of the hairpin conductor 4 are received in two different slots 5 and in two different layers Li. The hairpin conductor 4 is depicted in the form that it has when installed on the stator 1. Prior to assembly, however, end sections 8 are straight in line with the leg portions 6. The end sections 8 are bent after the insertion of the hairpin winding into the slots 5.

Figure 4:
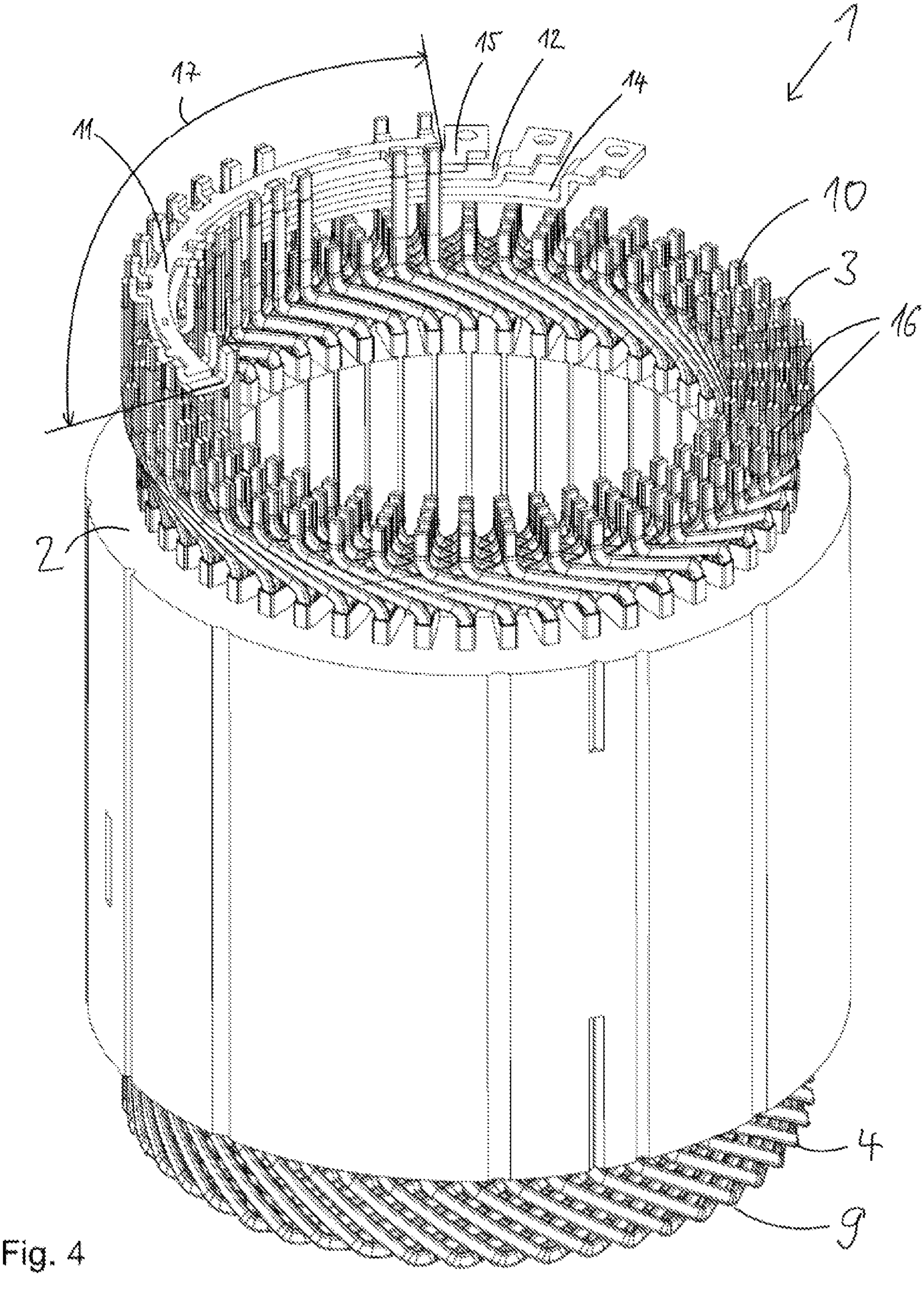
FIG. 4 shows the embodiment of FIG. 1 in perspective.

In FIG. 4, the stator 1 of FIG. 1 is shown in perspective. The head portions 7 of the hairpin conductors 4 extend out of the stator core 2 at an insertion end 9. The part of the hairpin winding 3 extending at the insertion end 9 is also referred to as crown side. The end sections 8 of the leg portions 6 opposite of the head portions 7 extend out of the stator core 2 at a welding end 10. The hairpin winding 3 is assembled outside the stator 1 and then inserted into the slots 5 from the insertion end 9. The end sections 8 of the leg portions 6 are straight until after their insertion into the stator core 2, and subsequently bent into the depicted form, wherein the end sections 8 of the leg portions 6 in one slot 5 are bent alternatingly from layer to layer clockwise and counter-clockwise. The hairpin winding 3 defines three phase windings for three phases U, V and W. Each phase winding has four parallel branches starting at a phase terminal Un, Vn, Wn, and ending at a neutral terminal NUn, NVn, NWn. In the designation of the phase terminals and the neutral terminals, the "U, V and W" identify the phases and the "n" is an index identifying the respective branch, i.e. in this embodiment 1 to 4. The phase terminals Un, Vn, Wn and neutral terminals NUn, NVn, NWn are completely designated in FIG. 5 and described in detail with reference to FIG. 5. All the phase terminals Un, Vn, Wn and neutral terminals NUn, NVn, NWn are arranged at the welding end 10. The hairpin conductors 4 forming one branch are electrically interconnected serially by spot welding at the end sections 8. The end sections 8 forming the phase terminals Un, Vn, Wn and neutral terminals NUn, NVn, NWn extend axially beyond the end sections 8 forming the spot-welded electrical interconnections 16. The four phase terminals Un of the parallel branches of the U phase winding are connected to a respective U phase busbar 12, the phase terminals Vn of the V phase winding are connected to a V phase busbar 14, and the phase terminals Wn of the W phase winding are connected to a respective W phase busbar 15. The neutral terminals NUn, NVn, NWn are all connected to a neutral busbar 11, forming, in this embodiment, a star connection. A terminal connection range 17 is defined by a sector of a circumference of the stator 1 occupied by the phase terminals Un, Vn, Wn and the neutral terminals NUn, NVn, NWn on the welding end 10. The terminal connection range 17 spans less than one half of the circumference of the stator 1, and in this embodiment less than one third of the circumference of the stator 1.

Figure 5:
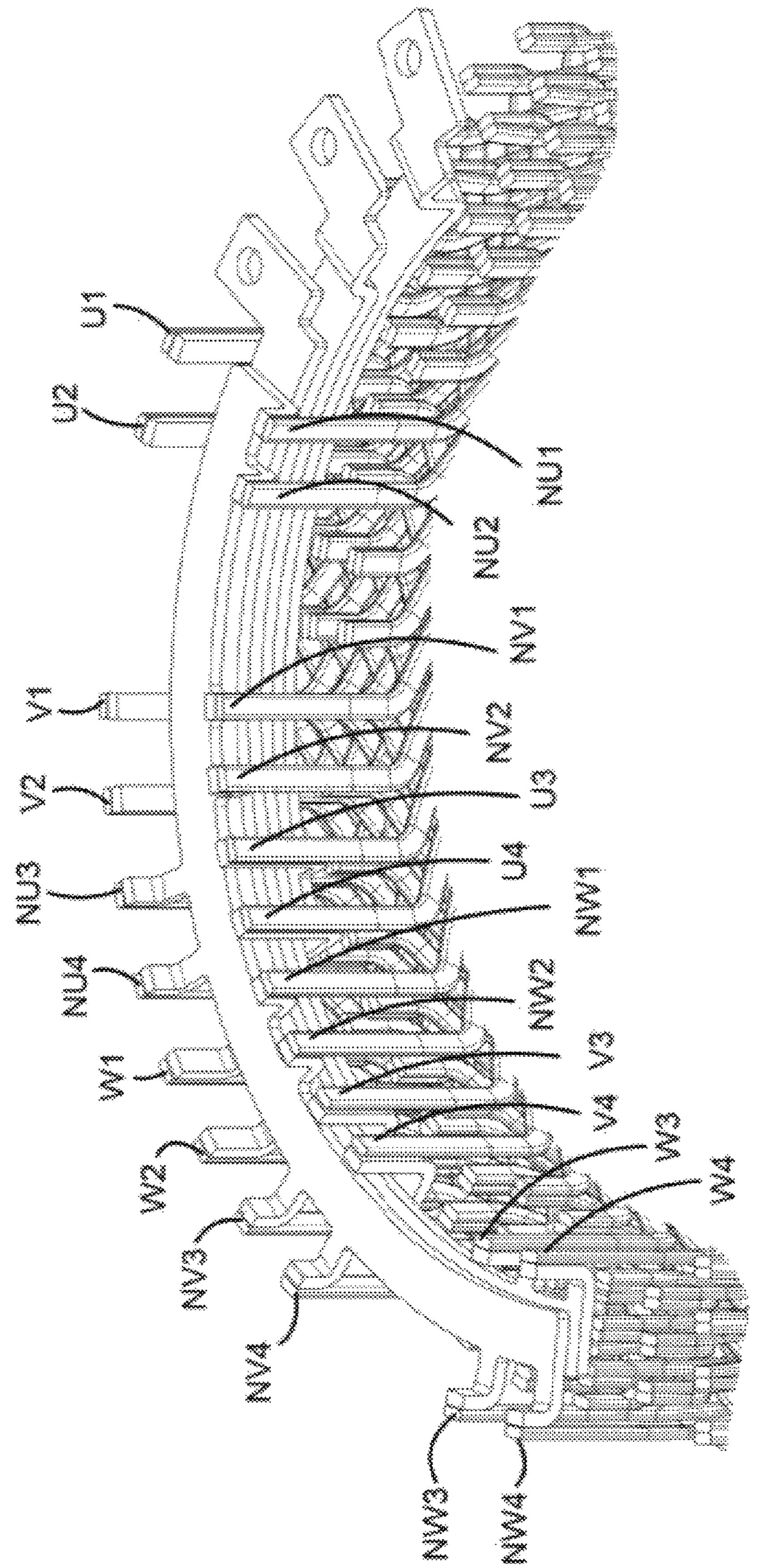
FIG. 5 shows an enlarged detail of FIG. 4.

In FIG. 5, the welding end 10 of FIG. 4 is shown as an enlarged detail. The arrangement of the phase terminals Un, Vn, Wn and neutral terminals NUn, NVn, NWn is described in its entirety with regard to FIG. 5. The hairpin winding 3 defining the three phase windings comprises four parallel branches per phase U, V, W. The phase terminals are designated U1, U2, U3, U4, V1, V2, V3, V4, W1, W2, W3, W4 and the neutral terminals NU1, NU2, NU3, NU4, NV1, NV2, NV3, NV4, NW1, NW2, NW3, NW4. The phase terminals designated U1, U2, V1, V2, W1, W2 and the neutral terminals designated NU3, NU4, NV3, NV4, NW3, NW4 are arranged in the outermost layer L8 of the radially adjacent layers Li (FIG. 2A), and the phase terminals designated U3, U4, V3, V4, W3, W4 and the neutral terminals designated NU1, NU2, NV1, NV2, NW1, NW2 are arranged in the innermost layer L1 of the radially adjacent layers Li. In the depicted embodiment, the phase terminals Un, Vn, Wn are evenly divided between the outermost layer Lz and the innermost layer L1. The phase terminals Un, Vn, Wn and the neutral terminals NUn, NVn, NWn are condensedly arranged in a sector of the circumference of the stator 1, the terminal connection range 17. The radially extending rows of end sections 8 generally correspond to the 48 slots of the stator 1, on the premise that the end sections 8 are all bent the same radial distance in clockwise and counter-clockwise directions. The terminal connection range 17 thus spans in this embodiment over 16 of the 48 slots 5, or over a circular sector of 120° of the stator 1. The terminal connection range 17 includes four slots 5, or rows, having end sections 8 with the shorter spot-welded electrical interconnections 16, which are enclosed by the longer phase terminals Un, Vn, Wn and neutral terminals NUn, NVn, NWn. All welding operations with regard to the connections of the phase terminals Un, Vn, Wn and the neutral terminals NUn, NVn, NWn to the busbars 11, 12, 14, 15 are limited to one third of the stator circumference.

Figure 6A:
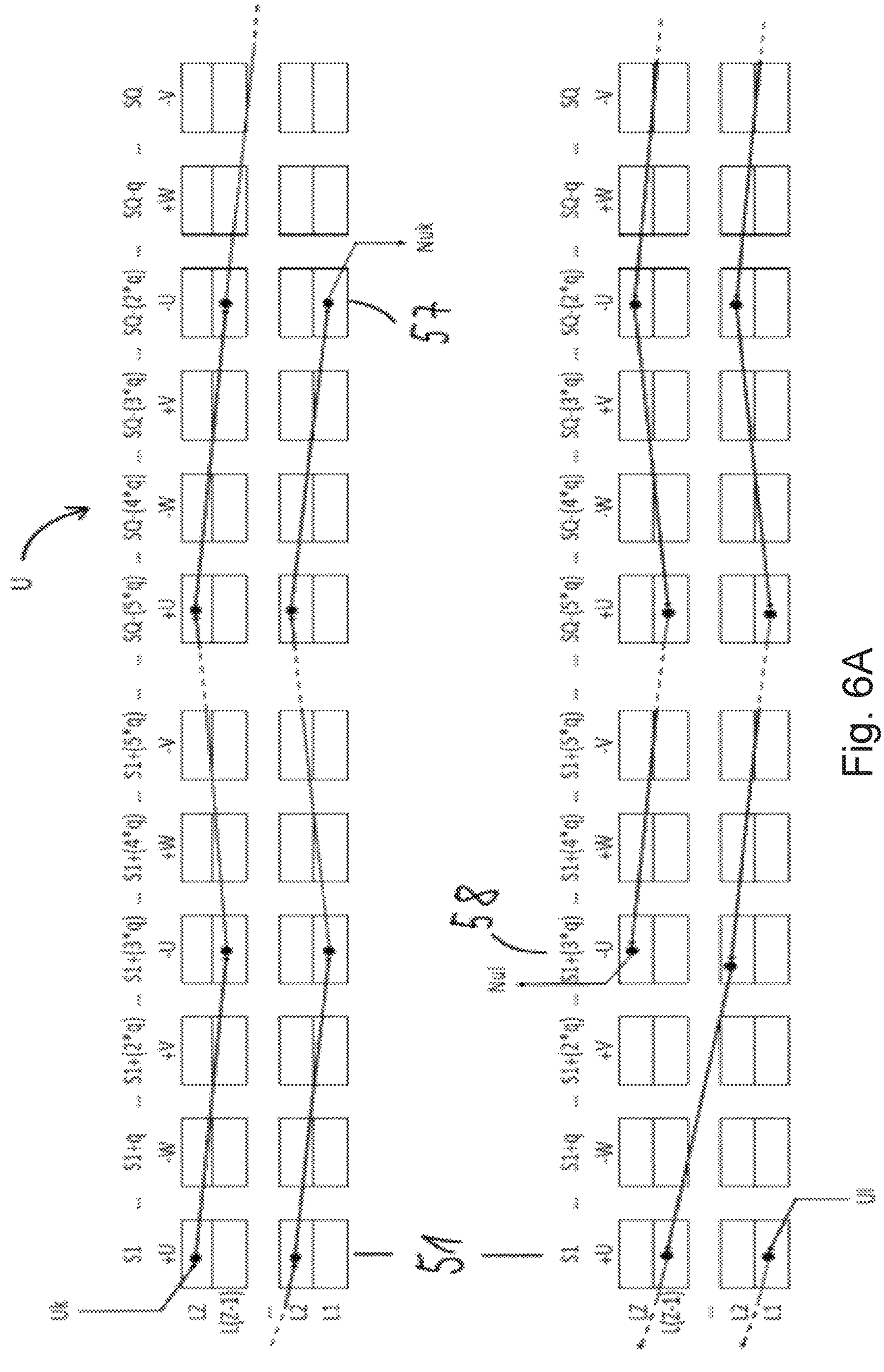
FIGS. 6A, 6B, 6C show a generalised scematics of three phases of a winding structure.
Figure 6B:
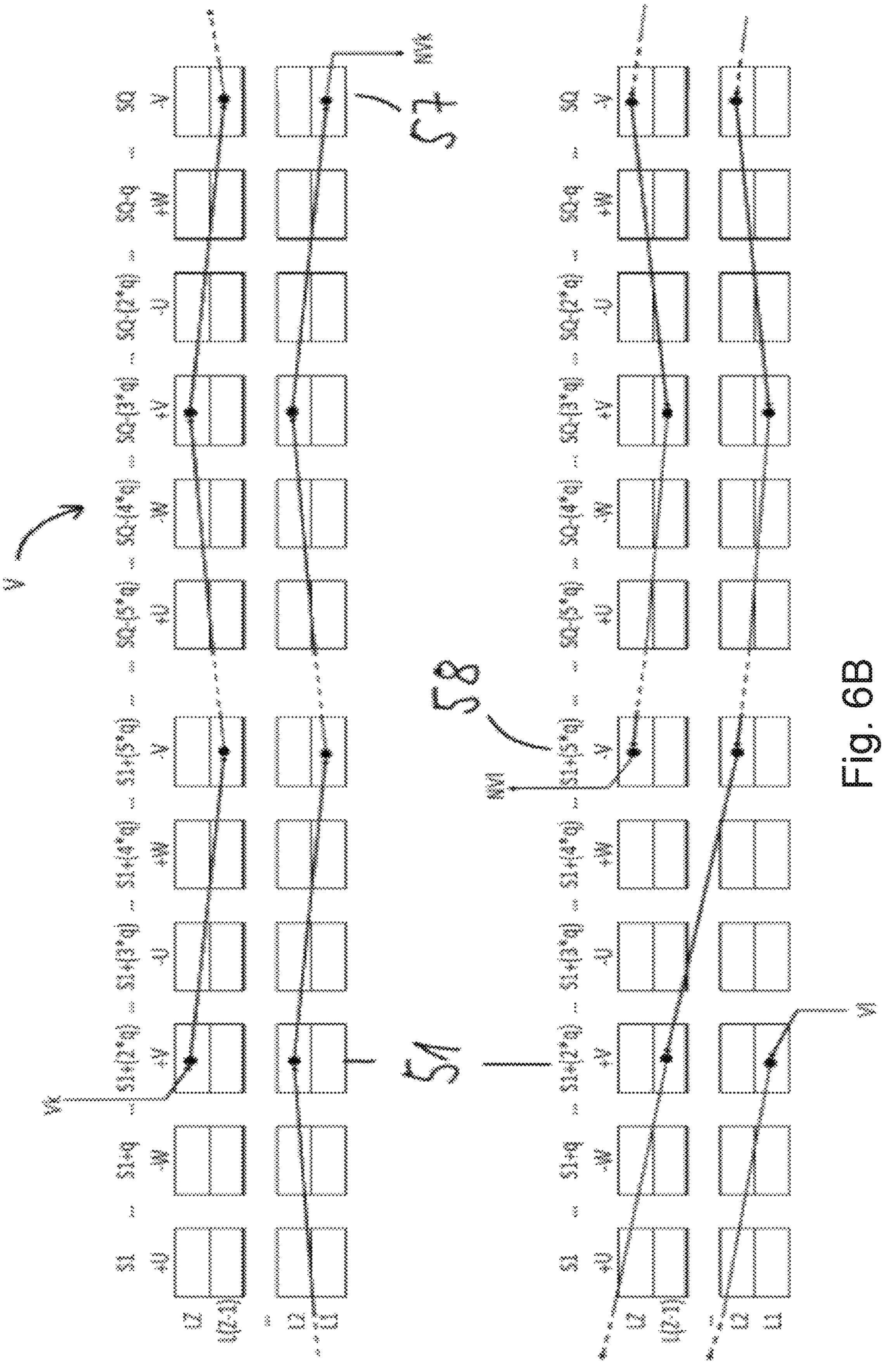
Figure 6C:
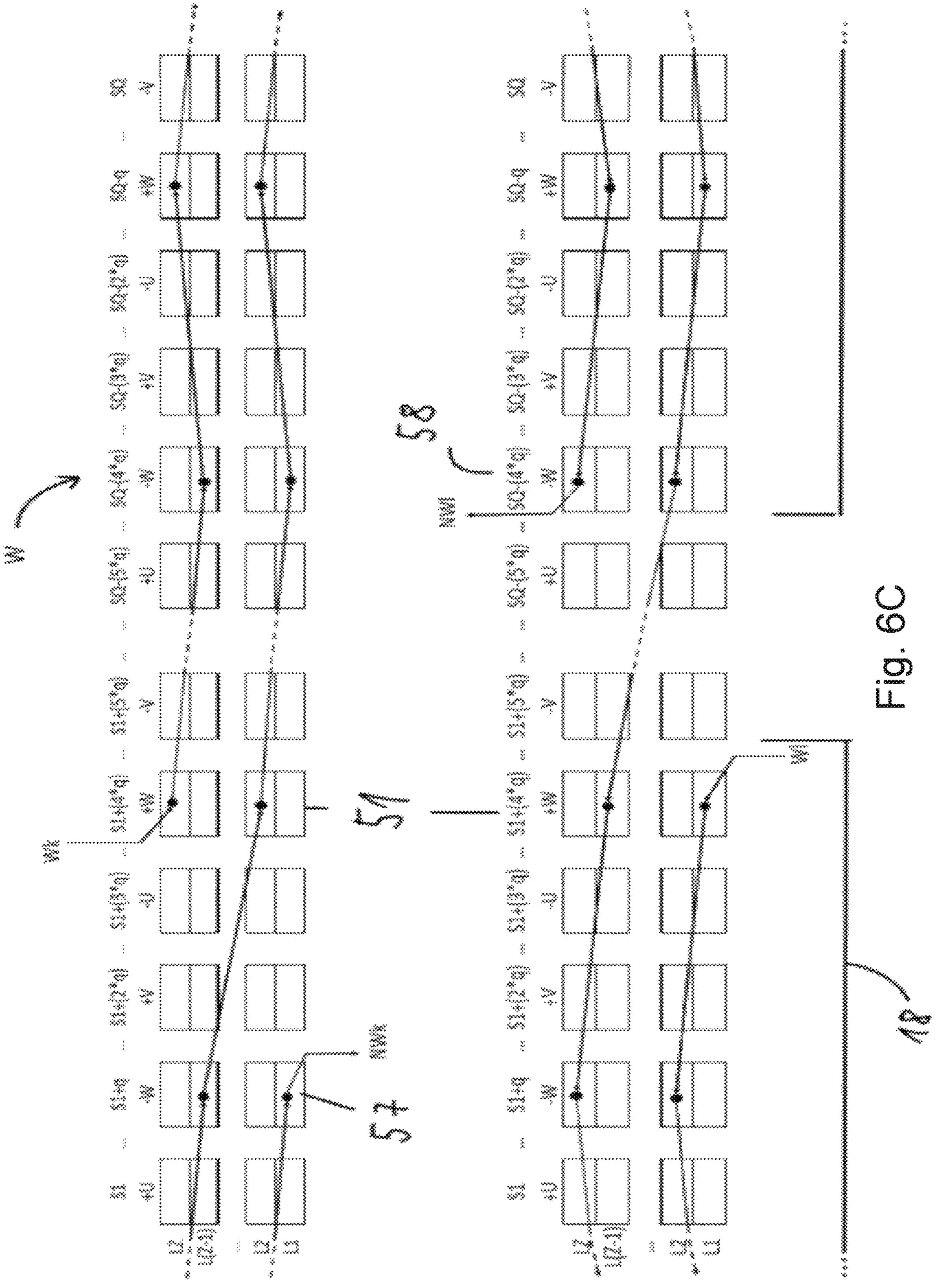

In FIGS. 6A, 6B and 6C, generalised schematics of three phases of a winding structure for a stator with discretionary parameters are shown FIG. 6A shows the U phase; FIG. 6*b* shows the V phase; and FIG. 6C shows the W phase. The upper matrices of each phase illustrate an example of a branch of the respective phase winding with the phase terminals Uk, Vk, Wk of the respective parallel branches number k in the outermost layer Lz and the neutral terminals NUk, NVk, NWk of said parallel branches number k in the innermost layer L1, with k being an integer number between 1 and N/2, N being the total number of parallel branches per phase winding. The lower matrices of each phase U, V, W illustrate a further example of a branch of the respective phase winding with the phase terminals Ul, Vl, Wl of the parallel branches number l in the innermost layer L1 and the neutral terminals NUl, NVl, NWl of said parallel branches number l in the outermost layer Lz, with l being integer numbers between N/2+1 and N. The matrices represent the slots 5 in columns and the layers Li rows for an arbitrary number of slots 5 and layers Li, to illustrate that the proposed concept is modular and can be applied to stator cores with discretionary parameters, provided the parameters follow the conditions as described below, with z being the number of layers and Qs being the number of stator slots 5.

The layers are designated Li, with i being an index from the innermost layer L1 to the outermost layer Lz. Accordingly, the matrix number i designates the rows, i baeing an integer number from 1 to z, i= [1, z]. The slots are designated Sj, with j being an index from S1 to SQs. Accordingly, the matrix number j designates the columns, j being an integer number from 1 to Qs, j= [1, Qs]. The number of phase terminals in the outermost layer Lz is k, with k= [1, N/2]. The number of phase terminals in the innermost layer L1 is l, with I= [N/2+1, N]. The number z of layers per slot is at least two, 2≤ z, with z being an even integer number. The number p of pole pairs is at least one, 1≤ p, with p being an integer number. The number q of slots per pole and per phase is at least one, 1≤ q, q being an integer number. The number N of parallel branches per phase winding is between two and double the number of slots per pole and per phase, 2≤ N≤2q, with N being a positive divisor of 2q. The number Nph of phase winding turns calculates as Nph=(p*q*Z)/N. The number m of phase windings is at least three, m≥3, with m being an integer number. The number Qs of stator slots follows the rule Qs=2p*m*q.

The U phase branch of the upper matrix starts at the phase terminal Uk in slot S1 in the outermost layer Lz. The hairpin conductor 4 are represented by arrows pointing to the slot and layer to which they span. Broken lines of the arrows illustrate that an arbitrary number of slots and layers are spanned by the necessary number of hairpin windings 3. The branch terminates at the neutral terminal NUk in slot SQ−(2*q) in the innermost layer L1. The U phase branch of the lower matrix starts at the phase terminal U1 in slot S1 in the innermost layer L1. The winding direction of the hairpin conductor 4 has the opposite sense of rotation as the branch of the upper matrix. The branch terminates at the neutral terminal NUl in slot S1+ (3*q) in the outermost layer Lz. If the two branches of the U phase illustrated in FIG. 6 are installed in a stator core, slot S1 is one of the common phase slots 51, slot SQ−(2*q) is the first offset neutral slot 57, and slot S1+(3*q) is the second offset neutral slot 58.

The V phase branch of the upper matrix starts at the phase terminal Vk in slot S1+(2*q) in the outermost layer Lz. The branch terminates at the neutral terminal NVk in slot SQ in the innermost layer L1. The V phase branch of the lower matrix starts at the phase terminal Vl in slot S1+(2*q) in the innermost layer L1. The branch terminates at the neutral terminal NVl in slot S1+(5*q) in the outermost layer Lz. If the two branches of the V phase are installed in a stator core, slot S1+(2*q) is one of the common phase slots 51, slot SQ is the first offset neutral slot 57, and slot S1+(5*q) is the second offset neutral slot 58.

The W phase branch of the upper matrix starts at the phase terminal Wk in slot S1+(4*q) in the outermost layer Lz. The branch terminates at the neutral terminal NWk in slot S1+q in the innermost layer L1. The W phase branch of the lower matrix starts at the phase terminal Wl in slot S1+ (4*q) in the innermost layer L1. The branch terminates at the neutral terminal NWl in slot SQ−(4*q) in the outermost layer Lz. If the two branches of the W phase are installed in a stator core, slot S1+ (4*q) is one of the common phase slots 51, slot S1+q is the first offset neutral slot 57, and slot SQ−(4*q) is the second offset neutral slot 58.

The terminal slot range 18 of the winding structure spans from slot SQ−(4*q) via slot S1 to slot S1+ (4*q). From the slots SQ−q and SQ−(3*q), no phase terminal or neutral terminal extend at all, resulting in the shorter spot-welded electrical interconnections 16 being enclosed by the longer phase terminals and neutral terminals in the terminal connection range 17 (FIG. 4). If the generalised winding pattern is applied to the embodiment of FIGS. 4 and 5, the windings depicted are those starting at the phase terminals U1, V1, W1 and U3, V3, W3, the stator core 2 having the following parameters:

z=8 layers per slot,
p=4 pole pairs,
q=2 slots per pole and per phase,
N=4 parallel branches,
Nph=32 in series phase winding turns,
k=3 phases,
Qs=48 slots.

Figure 7:
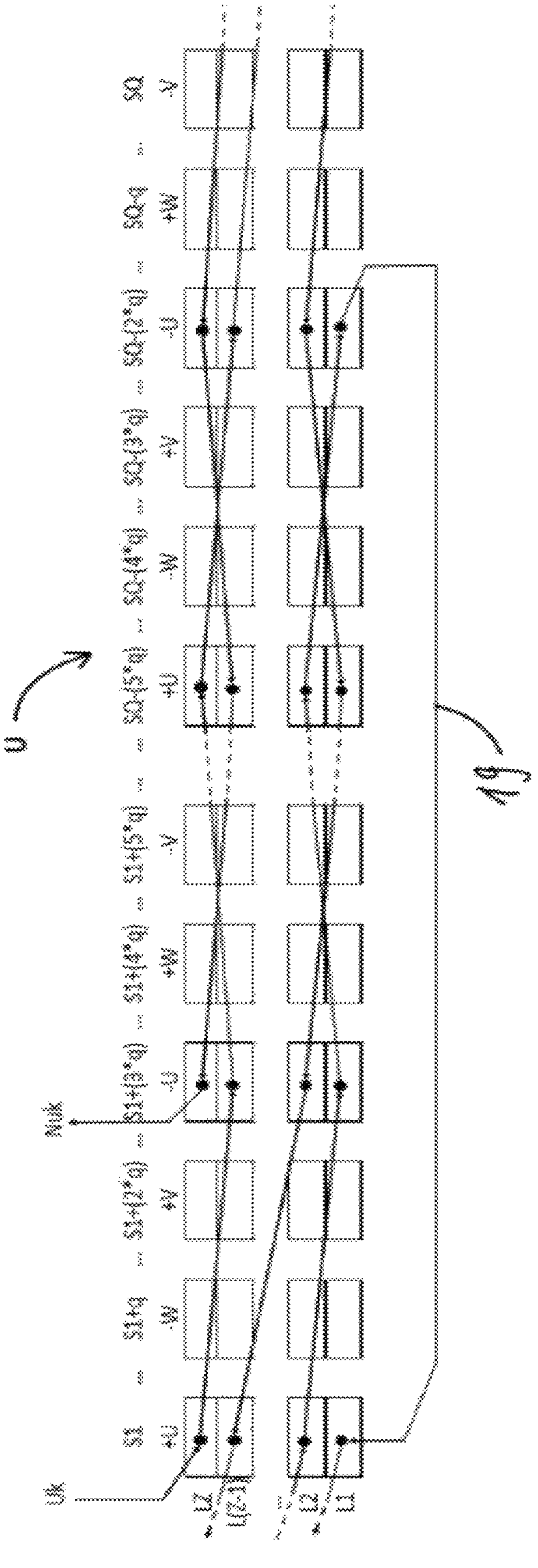
FIG. 7 shows a generalised schematic of a winding structure according to a further embodiment.

In FIG. 7, a generalised schematic of a winding structure according to a further embodiment is depicted for the U phase only. The statements regarding the designations and conditions made for FIG. 6 apply as well for FIG. 7. The embodiment is provided, however, for stators with a number of parallel branches N that is smaller than twice the number of slots per pole and per phase, N<2q. The branch starts at the phase terminal Uk in slot S1 in the outermost layer Lz and completes the winding around the innermost layer L1 in slot SQ−(2*q), however, without terminating there. Instead, the end section 8 extending from slot SQ−(2*q) is connected to a first end of a jumper 19, which is connected at its second end to the end section 8 extending from slot S1 in the innermost layer L1. From there, the branch changes the sense of rotation of the winding direction of the hairpin conductor 4 and terminates at the neutral terminal NUk in slot S1+(3*q) in the outermost layer Lz. In this embodiment, all the phase terminals Un of the branches per phase can be introduced only through the outermost layer Lz, and the corresponding neutral terminals NUn exiting in the same layer, the outermost layer Lz. In the innermost layer L1 a configuration of jumpers 19 allows the connections in parallel, redistributing the outputs of the branches towards the input layer. The person skilled in the art is aware that the phase terminals Un and the corresponding neutral terminals NUn can alternatively be arranged in the innermost layer L1, with the connections by the jumpers 19 being realized in the outermost layer Lz.

Figure 8:
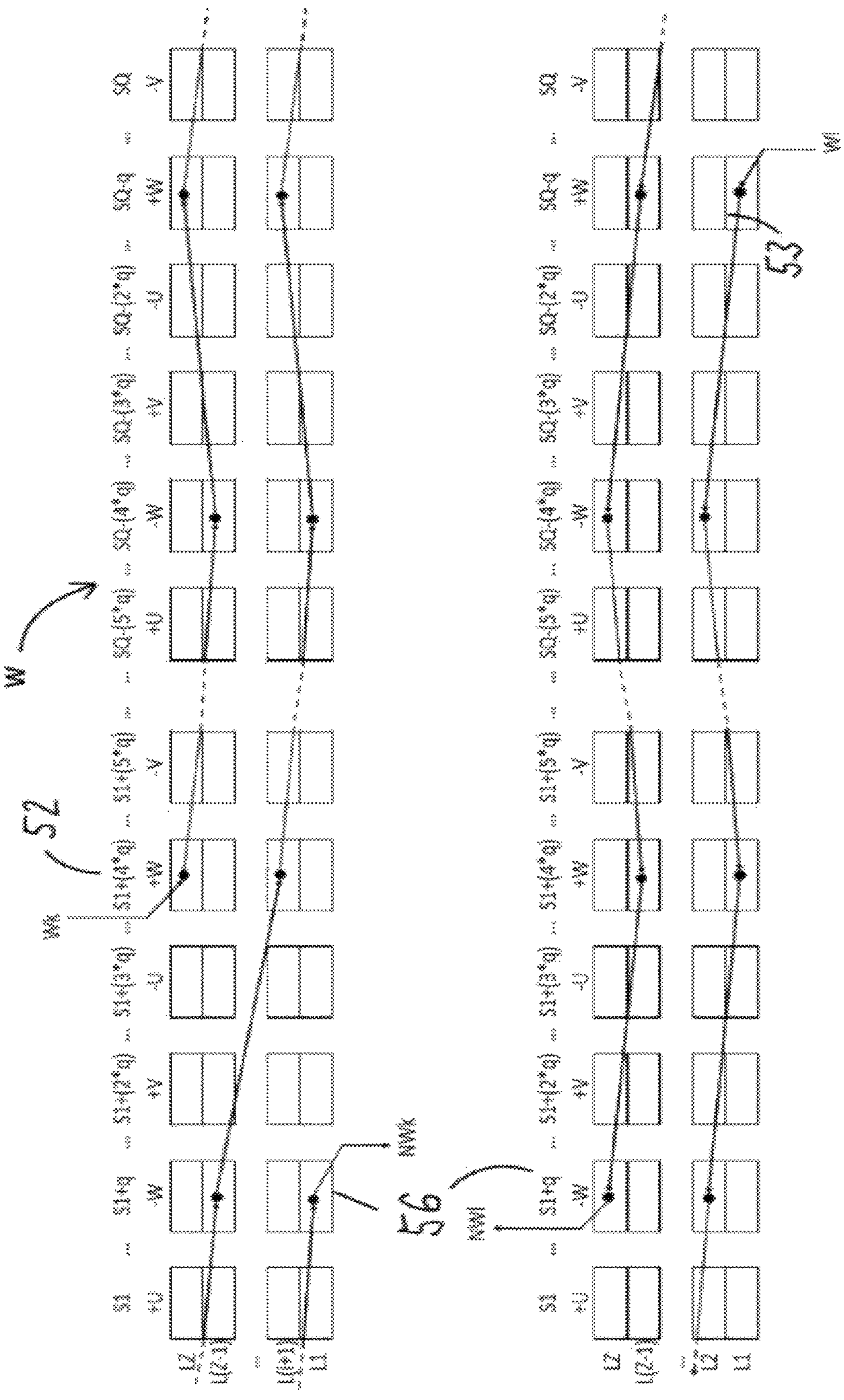
FIG. 8 shows a generalised schematic of a winding structure according to a further embodiment.

In FIG. 8, a generalised schematic of a winding structure according to a further embodiment is shown, wherein a span of the terminal connection range 17 (FIG. 9) over a circumference of the stator 1 is minimised. The statements regarding the designations and conditions made for FIG. 6 apply as well for FIG. 8. The U and V phase are identical to the embodiment of FIG. 6 and are not depicted again. The embodiment differs with regard to the W phase only, though the difference may apply to any one of the phases.

The W phase winding has a plurality of parallel branches, two of which are depicted, one in the upper matrix and one in the lower matrix. In the upper matrix, the phase terminal Wk extends from slot S+ (4*q) in the outermost layer Lz, and the neutral terminal NWk extends from slot S1+q in the innermost layer L1. In the lower matrix, the phase terminal Wl extends from slot SQ−q in the innermost layer L1, and the neutral terminal NWl extends from slot S1+q in the outermost layer Lz. The phase terminal Wk extends from a first offset phase slot 52 and the phase terminals Wl extends from a second offset phase slot 53. The first offset phase slot 52 is circumferentially offset relative to the at least one second offset phase slot 53. The two neutral terminals NWk, NWl, however, extend both from one common neutral slot 56. By offsetting one half of the phase terminals of at least one phase, the resulting structure does not enclose any of the shorter spot-welded electrical interconnections 16 between the longer phase terminals and neutral terminals in the terminal connection range 17 as can be seen in FIG. 9.

Figure 9:
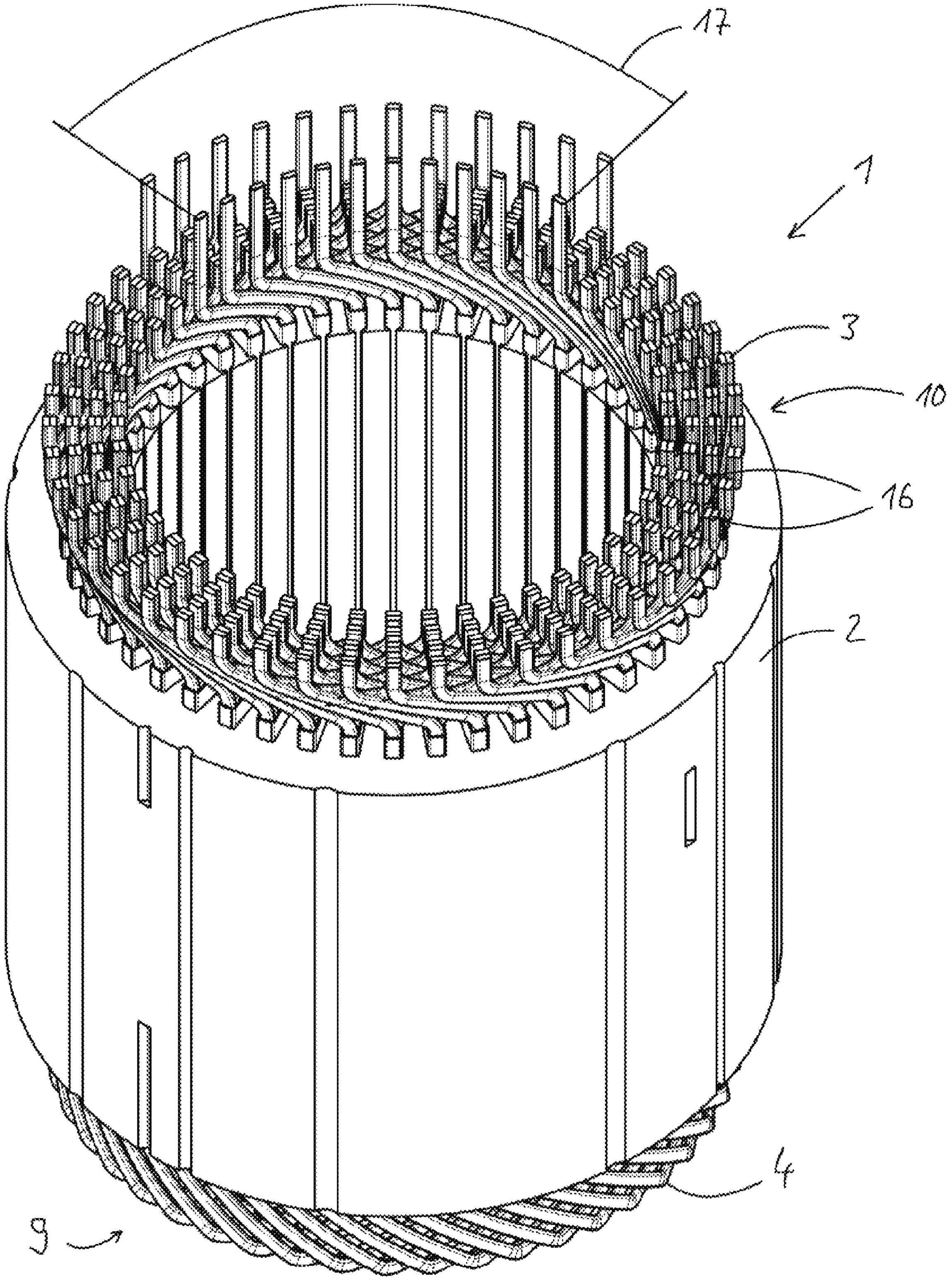
FIG. 9 shows an embodiment of a stator for an electric machine in perspective.

In FIG. 9, a further embodiment of a stator 1 for an electric machine is shown in perspective view. The end sections 8 extending out of the stator core 2 at the welding end 10 are straight until after their insertion into the stator core 2, and subsequently bent into the depicted form, the end sections 8 being bent alternatingly from layer to layer clockwise and counter-clockwise. The hairpin winding 3 defines three phase windings for three phases U, V and W. Each phase winding has four parallel branches starting at a phase terminal Un, Vn, Wn, and ending at a neutral terminal NUn, NVn, NWn, which will be described in detail with regard to FIG. 10.

Figure 10:
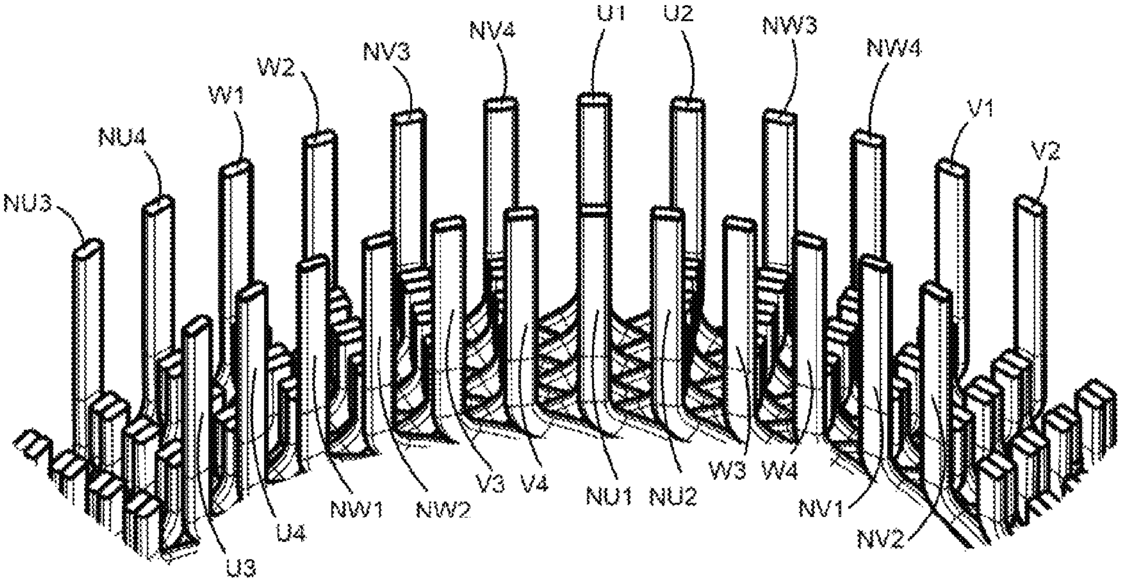
FIG. 10 shows an enlarged detail of FIG. 9.

In FIG. 10, an enlarged detail of FIG. 9 is shown. The FIGS. 9 and 10 are described together. All the phase terminals Un, Vn, Wn and neutral terminals NUn, NVn, NWn are arranged at the welding end 10. The hairpin conductors 4 forming one branch are electrically interconnected serially by spot welding at the end sections 8. The end sections 8 forming the phase terminals Un, Vn, Wn and neutral terminals NUn, NVn, NWn extend axially beyond the end sections 8 forming the spot-welded electrical interconnections 16. The four phase terminals Un of the parallel branches of the U phase winding are connected to a respective U phase busbar 12 (FIGS. 11 and 12), the phase terminals Vn of the V phase winding are connected to a V phase busbar 14, and the phase terminals Wn of the W phase winding are connected to a respective W phase busbar 15. The neutral terminals NUn, NVn, NWn are all connected to a neutral busbar 11, forming, in this embodiment, a star connection. A terminal connection range 17 is defined by a sector of a circumference of the stator 1 occupied by the phase terminals Un, Vn, Wn and the neutral terminals NUn, NVn, NWn on the welding end 10. The terminal connection range 17 spans one quarter of the circumference of the stator 1, or 12 slots of the 48 slots. The span of the terminal connection range 17 is minimised and thus even more compact than the one depicted in FIG. 4.

The hairpin winding 3 defining the three phase windings comprises four parallel branches per phase U, V, W. The phase terminals are designated U1, U2, U3, U4, V1, V2, V3, V4, W1, W2, W3, W4 and the neutral terminals NU1, NU2, NU3, NU4, NV1, NV2, NV3, NV4, NW1, NW2, NW3, NW4. The phase terminals designated U1, U2, V1, V2, W1, W2 and the neutral terminals designated NU3, NU4, NV3, NV4, NW3, NW4 are arranged in the outermost layer L8 of the radially adjacent layers Li, and the phase terminals designated U3, U4, V3, V4, W3, W4 and the neutral terminals designated NU1, NU2, NV1, NV2, NW1, NW2 are arranged in the innermost layer L1 of the radially adjacent layers Li. In the depicted embodiment, the phase terminals Un, Vn, Wn are evenly divided between the outermost layer Lz and the innermost layer L1. The phase terminals Un, Vn, Wn and the neutral terminals NUn, NVn, NWn are condensed in a sector of the circumference of the stator 1, the terminal connection range 17. The radially extending rows of end sections 8 generally correspond to the 48 slots of the stator 1, on the premise that the end sections 8 are all bent the same radial distance in clockwise and counter-clockwise directions. In this embodiment, the terminal connection range 17 thus spans 12 of the 48 slots, or a circular sector of 90° of the stator 1. The terminal connection range 17 does not include any slots or rows having end sections 8 with the shorter spot-welded electrical interconnections 16. All welding operations with regard to the connections of the phase terminals Un, Vn, Wn and the neutral terminals NUn, NVn, NWn to the busbars 11, 12, 14, 15 are limited to one quarter of the stator circumference.

Figure 11:
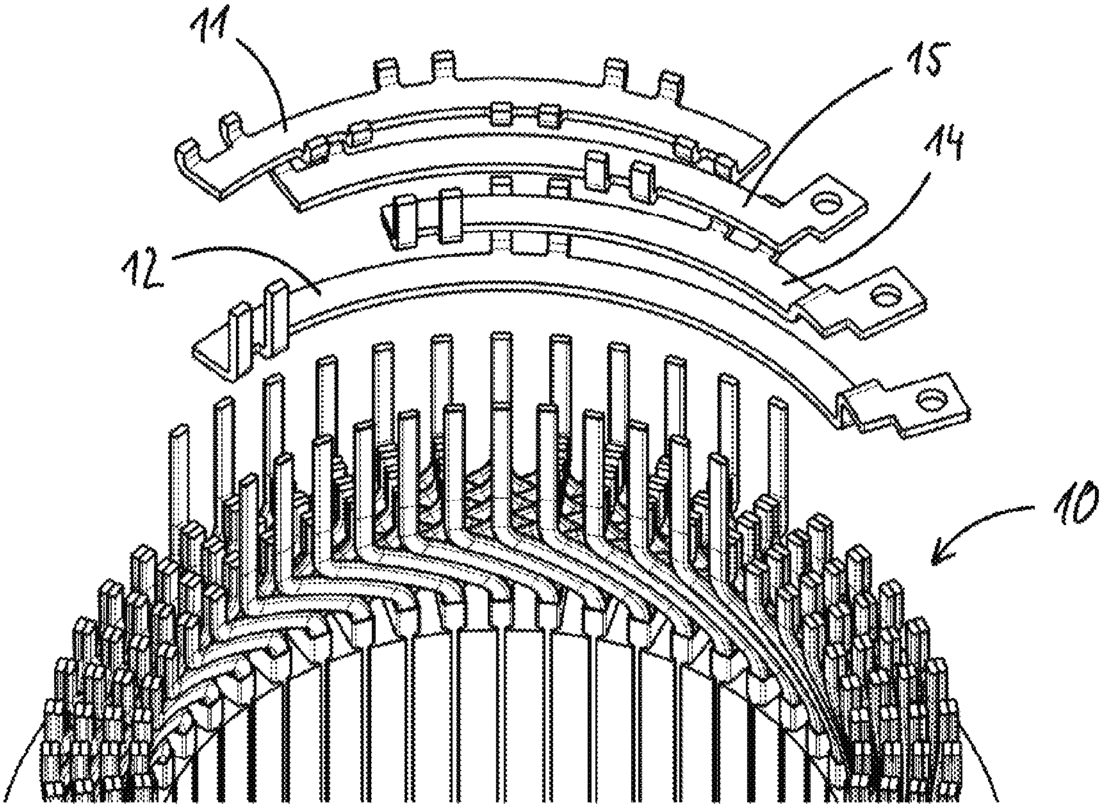
FIG. 11 shows an enlarged detail of FIG. 9 with busbars in an exploded view.
Figure 12:
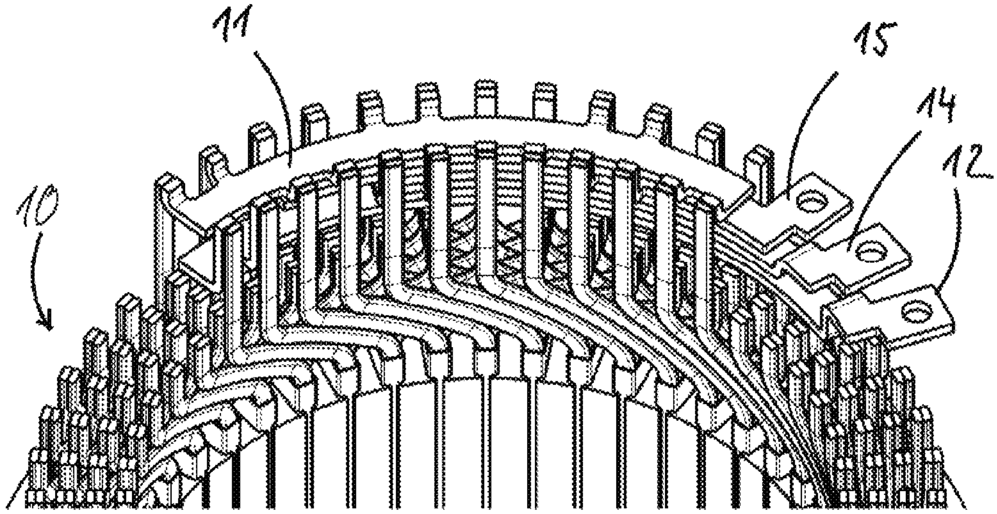
FIG. 12 shows the detail of FIG. 11 in perspective view.

In FIG. 11, an enlarged detail of FIG. 9 is depicted with the neutral busbar 11, the U phase busbar 12, the V phase busbar 14 and the W phase busbar 15 in an exploded view. In FIG. 12, the detail of FIG. 11 is depicted in perspective view with the neutral busbar 11, the U phase busbar 12, the V phase busbar 14 and the W phase busbar 15 in their respective final positions when installed on the welding end 10 of the hairpin winding 3.

Figure 13A:
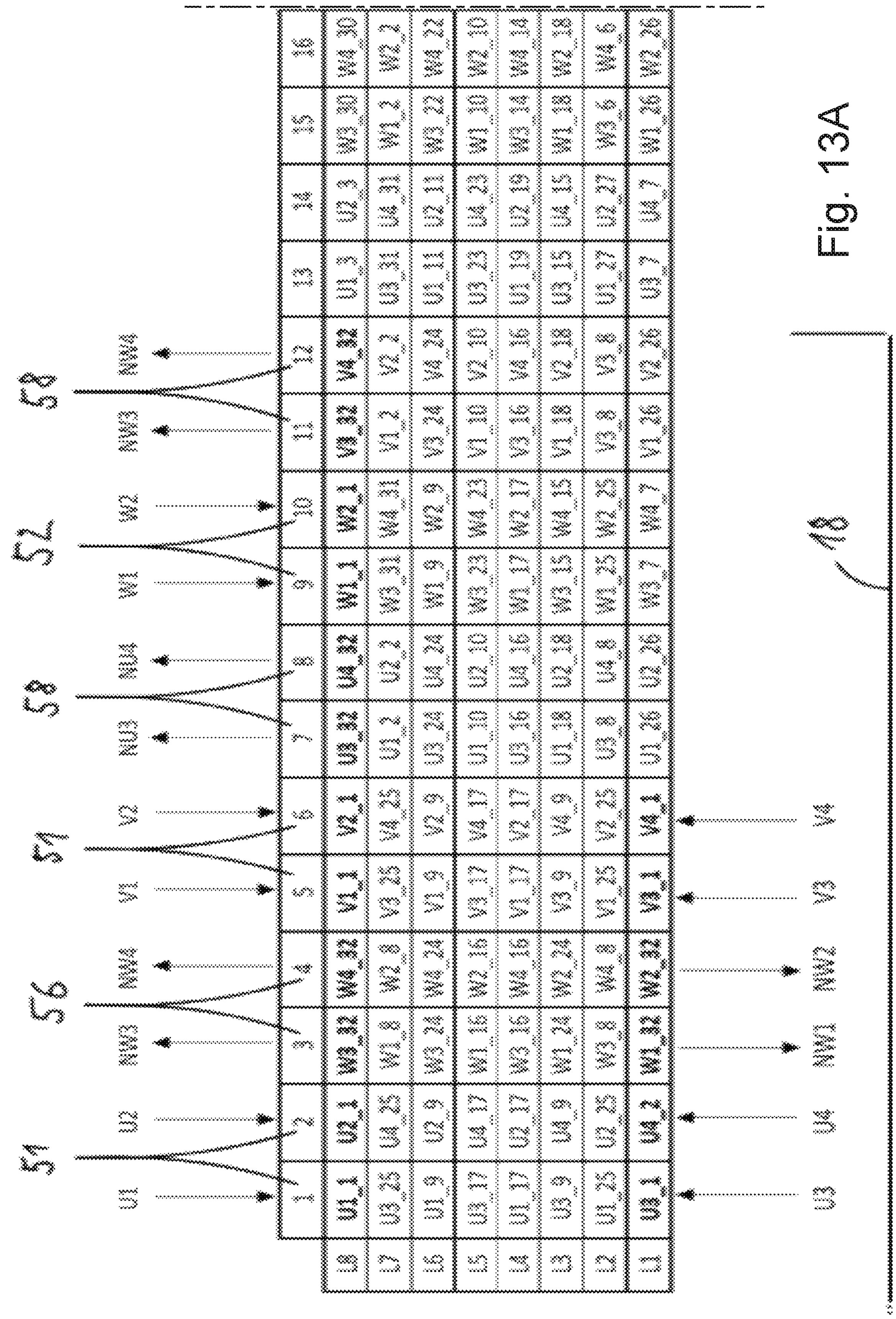
Figure 13C:
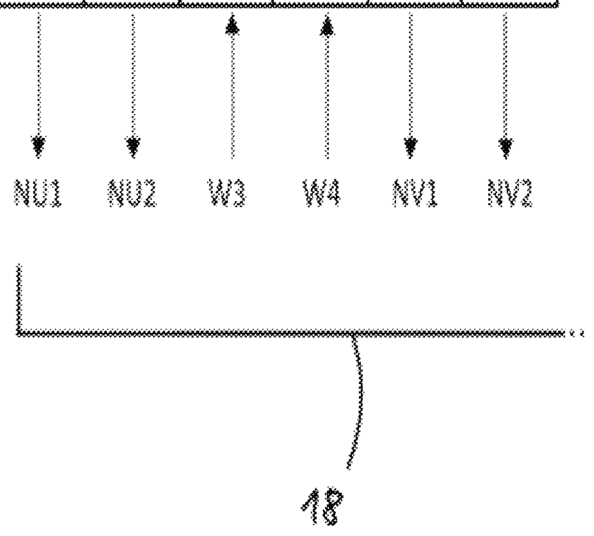

FIGS. 13A, 13B and 13C, an example of a schematic of a winding structure for a further embodiment of the stator is illustrated. FIG. 13A shows the lefthand section of the schematic; FIG. 13B shows the middle section of the schematic; and FIG. 13C shows the righthand section of the schematic. The allocation of the hairpin winding's phase terminals Un, Vn, Wn and neutral terminals NUn, NVn, NWn to the slots 5 of the stator is described. The matrix represents the slots 5 in columns and the layers L1 to L8 in rows. In the top row, the slot numbers 1 to 48 are designated. In the left column, the layer designations L1 to L8 are given. The matrix is divided into three parts, which are to be understood in consecutive order, according to the slot numbers. The inscriptions of the matrix elements illustrate the route of each branch through the slots and layers. The inscriptions are given in the form "Ux_y" for the branches of the U phase, "Vx_y" for the branches of the V phase and "Wx_y" for the branches of the W phase, with x designating the branch number and y designating a consecutive counting number from the respective phase terminals Un, Vn, Wn to the respective neutral terminals NUn, NVn, NWn of each branch. The matrix elements with the four phase terminals of the U phase are accordingly designated U1_1, U2_1 in the outermost layer L8, and U3_1, U4_1 in the innermost layer L1, in slots Nos. 1 and 2. The four phase terminals of the V phase are accordingly designated V1_1, V2_1 in the outermost layer L8, and V3_1, V4_1 in the innermost layer L1 in slots Nos. 5 and 6, The four phase terminals of the W phase are accordingly designated W1_1, W2_1 in the outermost layer L8, and W3_1, W4_1 in the innermost layer L1 in slots Nos. 9, 10, 45 and 46.

An example structure of the hairpin winding 3 is described for the first branch of the U phase. The leg portion 6 (see FIG. 3) forming the phase terminal U1 is arranged in slot No. 1 in the outermost layer L8, with the matrix element designation U1_1. The second leg portion 6 of the same hairpin conductor 4 is found in the adjacent negative pole of the U phase winding, in slot No. 7 in the adjacent layer L7, with the matrix element designation U1_2. The distance from slot No. 1, layer L8 to slot No. 7, layer 7 is the slot pitch of the hairpin conductor 4. The slot pitch of six slots 5 in circumferential direction and one layer Li in axial direction is identical for all hairpin conductors 4 of the hairpin winding 3. An example route of the first branch of the U phase winding is further described. The end section 8 of the leg portion 6 designated as U1_2 is spot-welded on the welding end 10 to the subsequent second hairpin conductor 4, designated as U1_3 in slot No. 13, outermost layer L8 in the following positive pole of the U phase winding, and U1_4 in slot No. 19, adjacent layer L7 in the following negative pole of the U phase winding. The latter end section 8 of the leg portion 6 is spot-welded to the third hairpin conductor 4, with designation U1_5, slot No. 25, layer L8, positive pole, and U1_6, slot No. 31, layer L7, negative pole etc. It is noted that the slot pitch of six slots in the circumferential direction and one layer Li in axial direction is also spanned on the welding end 10 by the bent end sections 8, wherein both end sections 8 of each welded pair 16 is offset by half the slot pitch (see FIG. 9). The fourth hairpin conductor 4 returns to the negative U phase pole with the leg portion designated U1_8 in slot No. 43. A second winding around the stator core 2 starts with the fifth hairpin conductor 4 in slot No. 1 again, now in the next layer L6, designation U1_9. The branch continues, now oscillating between layers L6 and L5, changing after a further full winding around the stator core 2 to layers L4 and L3. The final winding in the inner layers L2 and L1 ends with the sixteenth hairpin conductor 4 of the branch. The designation U1_32 marks the position of the leg portion 6 with the neutral terminal NU1 at its end section 8, in slot No. 43 in the innermost layer L1. It is noted that the neutral terminal NU1, due to its offset over half the slot pitch, is not located at the circumferential position of the slot No. 43, but at the circumferential position of the slot No. 46. It is further noted that the end section 8 of the phase terminal U1 of the same branch in the outermost layer L8 is offset in the opposite direction, thus also having the circumferential position of slot No. 46.

Regarding the other branches with the phase terminals U2, V1, V2, W1, W2 in the outermost layer L8, they are routed parallel to the above described branch, starting in slot Nos. 2, 5, 6, 9 and 10, respectively. The slot pitch of the hairpin conductors 4 is identical. The branches, which end in the neutral terminals NU3, NU4, NV3, NV4, NW3, NW4 in the outermost layer L8 must as well be routed parallel to avoid crossing the branches and to provide the unitary slot pitch of the hairpin conductors 4. Accordingly, the branches starting at the phase terminals U3, U4, V3, V4, W3, W4 in the innermost layer L1 wind around the stator core 2 in opposite sense of rotation as the branches with the phase terminals U1, U2, V1, V2, W1, W2 in the outermost layer L8. Starting from the innermost layer L1, the branches are routed towards the slots with the lower consecutive numbers. For example, the third branch of the W phase winding starts with the phase terminal W3 in slot No. 45 in the innermost layer L1, designated W3_1. The second leg portion 6 of the same hairpin conductor 4 is located in the adjacent negative pole of the W phase winding, in slot No. 39 in the adjacent layer L2, with the matrix element designation W3_2. The distance from slot No. 45, layer L1 to slot No. 39, layer 2 is the unitary slot pitch of the hairpin conductors 4 of six slots in circumferential direction and one layer Li in axial direction. Thus, all the branches are routed in parallel, with the phase terminals Un, Vn, Wn and neutral terminals NUn, NVn, NWn evenly distributed to the innermost layer L1 and the outermost layer L8.

The phase terminals Un, Vn extend pairwise from slots, which slots are referred to as common phase slots 51. The phase terminals U1 and U3 extend from the common phase slot 51 with slot number 1. The person skilled in the art is aware that the phase terminals Un, Vn extending pairwise from a common phase slot 51 will, however, not be arranged in the same row on the welding end 10, as the end sections 8 in the outermost layer L8 are bent in opposite sense of rotation as the end sections 8 in the innermost layer L1. In the depicted embodiment, the phase terminals U1 and U3 have a respective offset in circumferential direction of six rows or slots, i.e. the slot pitch of the hairpin conductors. In the depicted embodiment, a plurality of pairs of the phase terminals Un, Vn of the parallel branches extend pairwise from a plurality of adjacently arranged common phase slots 51. The common phase slots 51 of the U phase winding are slot Nos. 1 and 2, the common phase slots 51 of the V phase winding are slot Nos. 5 and 6. The phase terminals Wn of the W phase winding are offset, W1 and W2 extending from slot Nos. 9 and 10, which are referred to as first offset phase slots 52, and W3 and W4 extend from slot Nos. 45 and 46, which are referred to as second offset phase slots 53.

The neutral terminals NU1, NU2, NV1 and NV2 of the parallel branches of the respective phase windings U, V extend from the innermost layer L1 from first offset neutral slots 57, and the neutral terminals NU3, NU4, NV3 and NV4 extend from the outermost layer LZ from second offset neutral slots 58. The first offset neutral slots 57 are circumferentially offset relative to the second offset neutral slots 58. The first offset neutral slots 57 of the U phase winding are slot Nos. 43 and 44, which are offset relative to the second offset neutral slots 58 of the U phase winding in slot Nos. 7 and 8. The first offset neutral slots 57 of the V phase winding are slot Nos. 47 and 48, which are offset relative to the second offset neutral slots 58 of the V phase winding in slot Nos. 11 and 12. The offset is in each case twelve slots. The neutral terminals NW1, NW2, NW3, NW4 of the W phase winding extend from common neutral slots 56, which in this embodiment are the slot Nos. 3 and 4.

The common phase slots 51, the common neutral slots 56, the first offset neutral slots 57, the second offset neutral slots 58, the first offset phase slots 52 and the second offset phase slots 53 together define a terminal slot range 18 spanning, in a circumferential direction, a fraction of the total number of slots. In this embodiment, the terminal slot range 18 spans from slot No. 43 to slot No. 12, i.e. 18 slots. None of the slots of the terminal slot range is occupied by a non-terminal end-sections 8 in the outermost layer L8 or innermost layer L1. The terminal slot range 18 is greater than the terminal connector range 17, counted in slots, by the hairpin conductor's slot pitch of six slots (compare FIG. 9).

REFERENCE NUMERALS

1 Stator
2 Stator core
3 Hairpin winding
4 Hairpin conductor
5 Slot
51 Common phase slot
52 First offset phase slot
53 Second offset phase slot
56 Common neutral slot
57 First offset neutral slot
58 Second offset neutral slot
6 Leg portion
7 Head portion
8 End sections
9 Insertion end
10 Welding end
11 Neutral busbar
12 U phase busbar
14 V phase busbar
15 W phase busbar
16 Spot-welded interconnection
17 Terminal connector range
18 Terminal slot range
19 Jumper
A Longitudinal axis
Li Layers
U, V, W Phase windings
Un Phase terminals, U phase winding
Vn Phase terminals, V phase winding
Wn Phase terminals, W phase winding
NUn Neutral terminals, U phase winding
NVn Neutral terminals, V phase winding
NWn Neutral terminals, W phase winding

The invention claimed is:

1. A stator for an electric machine comprising:

a stator core having a plurality of slots and a hairpin winding;

wherein the hairpin winding comprises hairpin conductors with two leg portions connected at a head portion, wherein a slot pitch between the two leg portions is defined by the head portion, the slot pitch of each one of the hairpin conductors being identical;

wherein the leg portions of the hairpin conductors are received in the slots in at least two radially adjacent layers, the head portions extending out of the stator core at an insertion end and end sections of the leg portions opposite of the head portions extending out of the stator core at a welding end;

wherein the hairpin winding defines at least three phase windings, each phase winding having at least one branch, each branch of each phase winding having a phase terminal formed at one of the end sections for connecting to a phase busbar, and a neutral terminal formed at one of the end sections for connecting to a neutral busbar, wherein the phase terminals and the neutral terminals are all arranged at the welding end of the hairpin winding, in at least one of an outermost layer of the radially adjacent layers and an innermost layer of the radially adjacent layers, wherein each phase winding has a plurality of parallel branches, and wherein at least one pair of the phase terminals of the parallel branches of at least one phase winding extend both from one common phase slot, wherein a first half of the phase terminals of the parallel branches of at least one phase winding extend from the innermost layer of at least one first offset phase slot, and wherein a second half of the phase terminals of the at least one phase winding extend from the outermost layer of at least one second offset phase slot, and wherein the at least one first offset phase slot is circumferentially offset relative to the at least one second offset phase slot, wherein at least one pair of the neutral terminals of the parallel branches of at least one of the phase windings extend both from one common neutral slot, and wherein a first half of the neutral terminals of the parallel branches of at least one phase winding extend from the innermost layer of at least one first offset neutral slot, and wherein a second half of the neutral terminals of the at least one phase winding extend from the outermost layer of at least one second offset neutral slot, and wherein the at least one first offset neutral slot is circumferentially offset relative to the at least one second offset neutral slot.

2. The stator according to claim 1, wherein a terminal connection range is defined by a sector of a circumference of the stator occupied by the phase terminals and the neutral terminals on the welding end, and wherein a span of the terminal connection range is minimised.

3. The stator according to claim 1, wherein a plurality of pairs of the phase terminals of the parallel branches of the at least one phase winding extend pairwise from a plurality of adjacently arranged common phase slots.

4. The stator according to claim 1, wherein a plurality of pairs of the neutral terminals of the parallel branches of the at least one phase winding extend pairwise from a plurality of adjacently arranged common neutral slots.

5. The stator according to claim 1, wherein each phase winding has a plurality of parallel branches, and wherein at least one pair of the phase terminals of the parallel branches of at least one phase winding extends from one common phase slot, wherein the common phase slots, the first offset phase slots, the second offset phase slots, the common neutral slots, the first offset neutral slots and the second offset neutral slots together define a terminal slot range circumferentially spanning a fraction of the total number of slots.

6. The stator according to claim 1, wherein the terminal slot range spans a continuous range of adjacent slots, in which at least one phase terminal or at least on neutral terminal is arranged.

7. The stator according to claim 1, wherein each phase winding has a plurality of parallel branches, at least the phase terminal of a first branch and the neutral terminal of a second branch being arranged in one of the outermost layer and the innermost layer, wherein the first branch and the second branch are connected on the respective opposite one of the outermost layer and the innermost layer.

8. The stator according to claim 1, wherein the phase terminals are evenly divided between the outermost layer and the innermost layer.

* * * * *